Nov. 26, 1957. S. M. LLOYD 2,814,706
THREE-PHASE LIQUID RHEOSTAT
Filed March 21, 1956 3 Sheets-Sheet 1

INVENTOR
S M LLOYD
BY
ATTORNEY

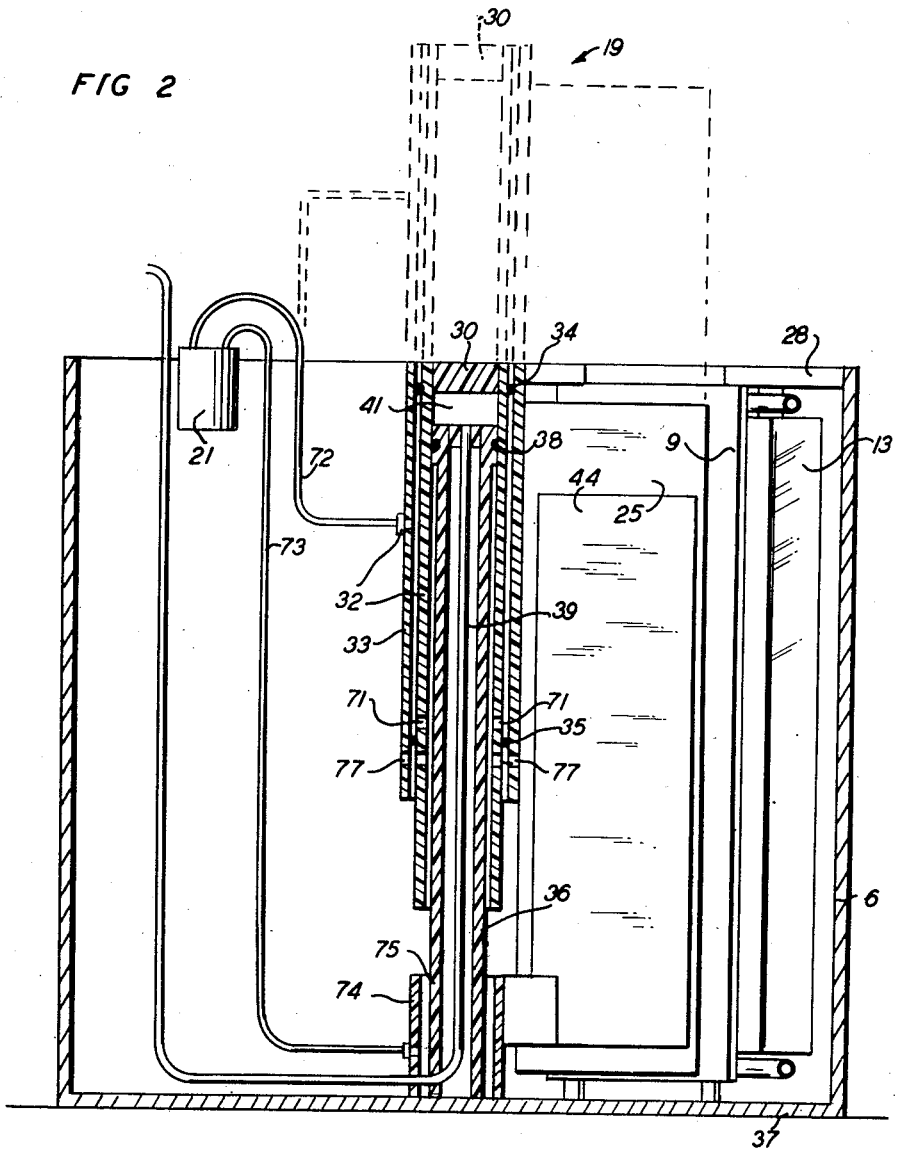

Nov. 26, 1957 S. M. LLOYD 2,814,706
THREE-PHASE LIQUID RHEOSTAT
Filed March 21, 1956 3 Sheets-Sheet 3

INVENTOR
S. M. LLOYD
BY
ATTORNEY

United States Patent Office 2,814,706
Patented Nov. 26, 1957

2,814,706

THREE-PHASE LIQUID RHEOSTAT

Stanley M. Lloyd, Pines Lake, N. J., assignor to Western Electric Company, Incorporated, New York, N. Y., a corporation of New York Application March 21, 1956, Serial No. 573,006

12 Claims. (Cl. 201—57)

This invention relates to a liquid rheostat, and particularly to a balanced three-phase rheostat having substantially equal impedances between phases for any load setting.

Liquid rheostats are particularly adaptable for testing generators or for controlling large motors because of their capability of dissipating large amounts of heat from their liquid electrolyte in which the electrodes are suspended. However, in making power performance tests on poly-phase generators, for example, it is desirable that the rheostat loading for each phase be substantially equal. In order to obtain equal loading, it is necessary that the leakage between phases and between the individual phases and ground potential be balanced for all load settings.

One of the main objects of this invention is an improved three-phase liquid rheostat of simple construction which presents substantially equal loading to each of the phases of a three-phase system with which it is used.

According to the general features of the invention, the rheostat has three electrodes mounted in symmetrical arrangement in a common tank to balance the leakage between electrodes and between the electrodes and the tank thereby keeping the tank at substantially mid-potential between the phases which is normally ground potential. The load changes are accomplished by moving an insulator separator between the electrodes.

According to an important feature of the invention, concentrated liquid electrolyte or salt solution may be added to the tank to increase the loading of the rheostat only when the separator is moved to fully expose the electrodes, which is full load position. This reduces the possibility of oversalting, which could result in overloading the rheostat by increasing the current density excessively and thereby damaging the electrodes.

According to another important feature, concentrated electrolyte is added to the tank by discharging it into the tank at the center of symmetry, thereby avoiding temporary unbalances of the phases whenever concentrated electrolyte is added.

Other features and objects of the invention will be more readily understood from the following detailed description taken in conjunction with the accompanying drawing, in which:

Fig. 2 is a simplified side elevational view partly in section showing the elevator mechanism for the separator and concentrated electrolyte dispensing system;

Figure 1:
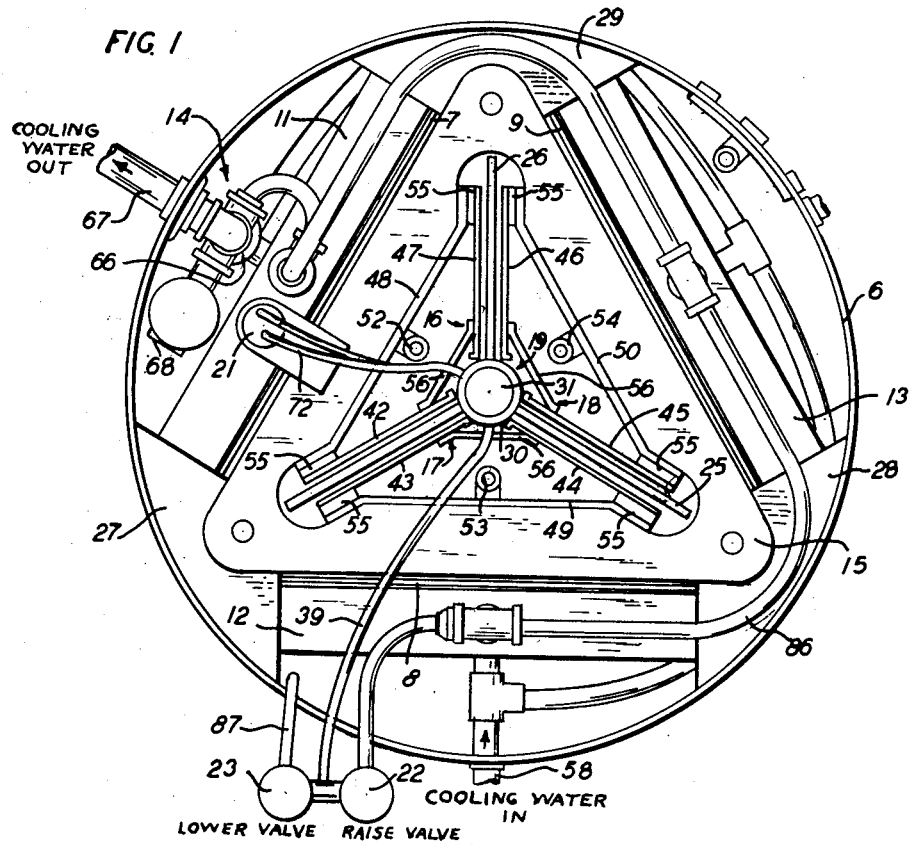
Fig. 1 is a top view of a three-phase rheostat incorporating the features of the invention.

Referring now to the drawing, the main parts of the rheostat include an open ended vertically positioned cylindrical steel tank 6; three flat rectangular insulator flow deflectors 7, 8 and 9; three flat substantially rectangular cooling coil assemblies 11, 12 and 13; a cooling water control system 14; a wooden support yoke or frame 15 mounted at the top of the tank; three fixed electrode assemblies 16, 17 and 18 supported by the yoke; a Y-shaped insulator separator 19, a container 21 for concentrated salt or electrolyte solution, and control valves 22 and 23 for operating the separator.

The flow deflectors, the cooling coils, the three electrode assemblies, and the elements 24, 25 and 26 of the separator 19 are symmetrically spaced within the tank in order to insure equal loading and leakage between phases and to the tank. The tank then will be at substantially mid-potential between phases which is ground potential, and the tank, even though of uninsulated metal, is not a hazard to personnel. The tank may be connected to ground potential as further protection. Flanges 27, 28 and 29, which extend inwardly from the upper rim of the tank 6, support the cooling coils adjacent the wall of the tank, equally spaced from central axis of the tank and uniformly spaced apart. These flanges also support the deflectors 7, 8 and 9 between coils 11, 12 and 13 and electrodes 16, 17 and 18, respectively. The electrolyte flow deflectors control turbulence and assure that the flow in all phases will be uniform.

The separator 19 is made of insulating material and includes three flat rectangular elements 24, 25 and 26 spaced 120 degrees from one another on a central hollow tubular support member 31. The member 31 includes an inner and an outer tube 32 and 33, respectively, mounted concentrically and rigidly together and sealed at the upper and lower ends by annular seals 34 and 35, respectively, to provide an opening therebetween. The top of the member 31 is sealed with a cap 30. The member 31 is slidably mounted on a cylinder 36, supported from the base 37 of the tank 6 along the central axis thereof. A sliding hydraulic seal 38 is provided between the upper end of the cylinder 36 and the inner surface of the tube 32 of the member 31. The upper end of cylinder 36 is capped and a tube 39 is provided therethrough for raising the separator by supplying fluid to the hydraulically sealed chamber 41 between the cylinder 36 and the inner surface of the member 31 of the separator.

The separator elements 24, 25 and 26 are positioned between opposed parallel rectangular plates 42 and 43 of electrodes 16 and 17, plates 44 and 45 of electrodes 17 and 18, and plates 46 and 47 of electrodes 18 and 16, respectively. The plates 47 and 42 of electrodes 16, 43 and 44 of electrodes 17, 45 and 46 of electrode 18 are strapped together at their upper ends by bus bars 48, 49 and 50, respectively, to which lugs 52, 53 and 54, respectively, are provided. The electrode plates are suspended from the yoke 15 by means of heavy conductive bars 55, the ends of which are bolted against the respective bus bars and the wood yoke. For greater structural strength, straps 56 are provided between the two plates of each electrode. It is to be noted that the elements 24, 25 and 26 of the separator extend beyond the edges of the electrode plates in order to obtain a low value of minimum load, i. e., when the separator is in its lowest position, and to reduce erosion of the edges of the electrode plates when the separator is in its minimum load position. The distance between opposing electrode plates around the interposing separator element is less than the distance to any other metallic detail in order to minimize leakage to the tank and to the cooling coils. The cooling coils are further protected by leakage from the electrodes by means of the insulating flow deflectors 7, 8 and 9 interposed therebetween.

Figure 4:
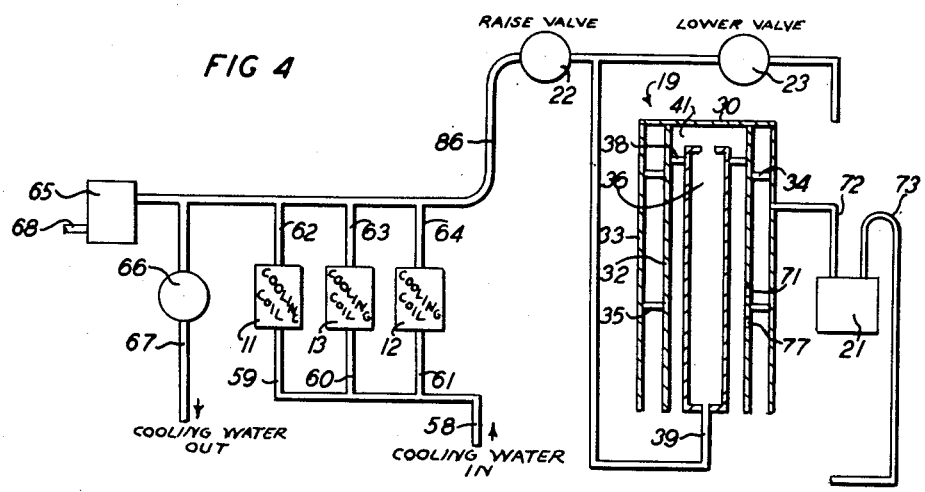
Fig. 4 is a schematic hydraulic diagram of the rheostat.
Figure 5:
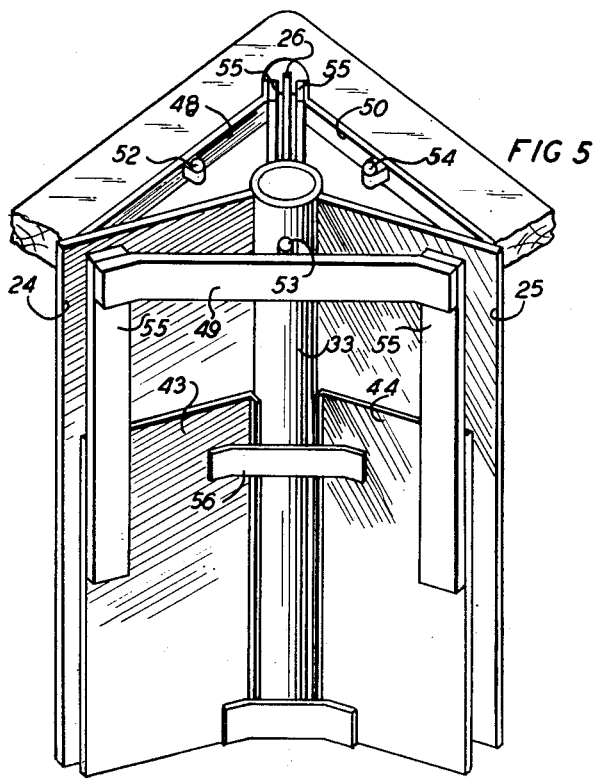
Fig. 5 is a partial perspective view of the electrode and separator structure.

The hydraulic system of the rheostat which is shown in schematic form in Fig. 4 comprises a cooling water intake pipe 58 near the bottom of the tank, a series of insulating tubing 59, 60 and 61 for feeding cooling water in parallel to the cooling coils 11, 13 and 12, respectively. The outputs of the cooling coils feed through insulating tubing 62, 63 and 64 to a water level regulator 65, and a cooling water flow regulator 66 which is an automatic temperature control valve inserted in the cooling water discharge pipe 67 for maintaining a substantially uniform electrolyte temperature. This type of flow regulator is a commercially available product having a bi-metallic actuator element which opens the valve to permit water flow for high water temperature and closes the valve to restrict water flow for low water temperature. Thus, for full rheostat load the valve will be wide open to permit maximum cooling. The level regulator 65 is a float valve for regulating the level of the electrolyte in the tank 6 and is needed due to a normally high evaporating rate of the electrolyte at operating temperatures. If the level is below a predetermined level, the valve 65 will open to permit the cooling water to be discharged through a valve port 68 into the tank until the level has been restored, at which time the valve will cut off. Water pressure for controlling the movement of the separator 19 is obtained by connecting the input to the raise valve 22 to the high side of the temperature control valve 66, which is also the output side of the cooling coils. The temperature control valve is normally partly closed, and therefore provides sufficient pressure for operating the separator. To raise the separator, the raise valve is opened to admit water under pressure to the tube 39, which fills the chamber 41 between the cylinder 36 and the inside of the tube 32. This water forces the separator 19 upwardly until it is moved to full load position, at which time the opposing electrode plates will be fully exposed to one another. In this full load position an aperture 71 in the inner tube 32 near the lower seal 35, and between the seal 35 and the upper seal 34, is uncovered or open to the expanded chamber 41. A tubing 72 from the salt or concentrated liquid electrolyte container 21 is connected to an aperture in the outer separator tube 33, which is located between the upper and lower seals 34 and 35 so that water being fed into the chamber 41 may pass through aperture 71 through the tube 72 to force concentrated electrolyte solution from the container 21 through a tubing 73 which feeds the concentrated electrolyte to an open ended discharge pipe 74 at the bottom of the tank and concentric with the cylinder 36. With this arrangement, the concentrated electrolyte is discharged through the upper opening 75 of the pipe 74 only when the separator element is moved to its maximum load position when the electrode plates are fully exposed. Further raising of the separator will cause water to flow from the chamber 41 through an overflow aperture 77 in the inner tube 32 which is below the lower seal 35 so that the water discharges directly into the tank. The separator may be held at full load condition during which time concentrated brine is continually being discharged into the tank, thereby increasing the power absorption of the rheostat. After a desired load has been achieved, as may be determined, for instance, by observing the power meter associated with the generator under test, the separator "raise" valve 22 is closed, thereby discontinuing the feeding of the water through the tube 39, which stops the discharging of the concentrated electrolyte to the tank.

Figure 3:
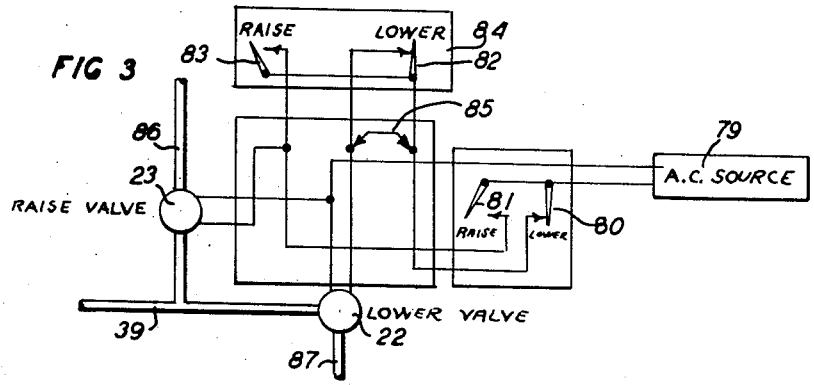
Fig. 3 is a circuit diagram for the rheostat.

It is to be noted that the concentrated electrolyte is discharged from the bottom of the tank at the center of symmetry thereof. As mentioned above, this substantially eliminates temporary unbalancing of the phases and, in addition, creepage (that is, a further increase in the power consumption of the rheostat after the "raise" valve has been closed) is reduced by delivering the concentrated electrolyte to the bottom of the electrodes where it tends to flow immediately upward between them. The control circuit shown in Fig. 3 may be utilized for operating the control valves 22 and 23 for the separator. In this circuit the "lower" and "raise" control valves 22 and 23 which are conventional solenoid-operated valves, may be selectively energized from a source of power 79 by means of switches 80 and 81, respectively, or by switches 82 or 83 of a remote control unit 84 which may be used in the event that remote control of operation of the solenoid is required. If this remote control unit is utilized, a strap 85 between the contact of the switch 80 and the "lower" valve 22 should be removed. When the "lower" valve 22 is energized, the valve is held closed by the A. C. supply and the switch 80 (or 82, if the remote control unit is used) is normally held in the closed condition, as shown in Fig. 3. When switch 81 (or 83, if the remote control unit is used) is closed, the "raise" valve 23 will open to permit water to flow from the tubing 86 through the valve and through tubing 39 to cause the separator to be raised upwardly. When the switch 81 is released, it opens, thereby stopping the separator. To lower the separator, switch 80 is opened in which case the "lower" valve 22 will be opened and water from the chamber 41 between the separator and the cylinder 36 will be discharged through the valve and a discharge tube 87 into the tank. In the case of a power failure, the "lower" valve 22 will become de-energized and thereby open and immediately lower the separator to its minimum load condition.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A three-phase liquid rheostat comprising a cylindrical tank for receiving liquid electrolyte, said tank being positioned with its central axis substantially vertical, three electrodes, each having a pair of flat surfaces forming an obtuse angle with one another, the electrodes being mounted in symmetrical relation in the tank so that each of the flat surfaces thereof is spaced from and parallel to one of the flat surfaces of the other two electrodes, a separator having a hollow support member and insulating elements extending therefrom for interposition between each pair of opposing flat electrode surfaces, the hollow member being closed at its upper end, and means for moving the hollow support along the major axis of the tank to vary the effective resistance between the electrodes comprising a cylindrical member extending from the bottom of the tank and axially along the tank for receiving the hollow support in sliding engagement therewith, a hydraulic seal between the hollow member and the cylindrical member and means for supplying fluid through the cylindrical member to move the hollow support therealong.

2. A rheostat according to claim 1 in which the hollow support is provided with an aperture through the wall near the lower end thereof to permit the fluid for raising the separator to overflow into the tank when the separator is raised a prescribed amount.

3. A three-phase liquid rheostat comprising a tank for receiving liquid electrolyte, three electrodes, means for mounting the electrodes in symmetrical relation in the tank, a separator having an insulating element interposed between each pair of electrodes, means for adjustably supporting the separator in the tank, means for moving the separator to vary the current between electrodes when the electrodes are connected to a three-phase source, a container for concentrated electrolyte and means for dispensing electrolyte from the container to the tank when the separator is raised to fully expose the electrode plates.

4. A rheostat according to claim 1, in which the hollow support has an aperture through its wall near the lower end thereof and having means for adding concentrated electrolyte to the tank comprising a container for the concentrated electrolyte and a tubing between the aperture and the container for discharging electrolyte from the container when the separator is raised to a predetermined height and the fluid for raising the separator flows through the tubing to the container.

5. In a rheostat according to claim 4, an open ended discharge pipe for the electrolyte mounted at the bottom of the tank and co-axially therewith, the open end of the pipe being below the electrodes and a tubing interconnected between the container and the pipe for discharging electrolyte from the container to the center of symmetry of the electrodes.

6. In a three-phase liquid rheostat, a cylindrical tank for receiving liquid electrolyte, three electrodes, each electrode having a pair of flat plates forming an obtuse angle with one another, means for mounting the electrodes symmetrically about the central axis of the tank so that each plate of each electrode is positioned apart from and parallel to one of the plates of the other electrodes, a separator having three flat insulator elements movably mounted along the major axis of the tank such that the elements are interposed between the plates of the electrodes, three cooling coils, means for mounting each of the coils adjacent the wall of the tank opposite one of the electrodes, and a flat insulator electrolyte flow deflector mounted between each electrode and its associated cooling coil.

7. A rheostat according to claim 6 in which the cooling coils are connected in parallel by insulating tubing.

8. In a three-phase liquid rheostat, a cylindrical tank for receiving liquid electrolyte, three electrodes, each electrode having a pair of flat plates forming an obtuse angle with one another, means for mounting the electrodes symmetrically about the central axis of the tank so that each plate of each electrode is positioned apart from and parallel to one of the plates of the other electrodes, a separator having three flat insulator elements movably mounted along the major axis of the tank such that the elements are interposed between the plates of the electrodes, three cooling coils, means for mounting each of the coils adjacent the wall of the tank opposite one of the electrodes, a common cooling water input pipe for the coils, a common cooling water output pipe for the coils, a temperature sensitive valve for controlling the flow of cooling water through the coils, and a flat insulator electrolyte flow deflector mounted between each electrode and its associated cooling coil.

9. In a rheostat according to claim 1 cooling coils for the tank, means for circulating water through the coils, a temperature sensitive valve for controlling the water flow and means for supplying water from the high pressure side of the valve to the cylindrical member for moving the separator.

10. A three-phase liquid rheostat comprising a tank for receiving liquid electrolyte, three electrodes, means for mounting the electrodes in symmetrical relation in the tank, a separator having an insulating element interposed between each pair of electrodes, means for adjustably supporting the separator in the tank, means for moving the separator to vary the current between electrodes when the electrodes are connected to a three-phase source, cooling coils for the tank, means for circulating water through the coils and a float valve for dispensing water from the cooling coils into the tank to maintain a constant liquid level in the tank.

11. A rheostat according to claim 1 in which the means for supplying fluid through the cylinder to move the hollow support comprises a first valve connected between a source of fluid and the cylindrical member for selectively admitting fluid thereto to raise the separator and a second valve connected to the cylindrical member for selectively discharging fluid therefrom into the tank to lower the separator.

12. A rheostat according to claim 10 in which the valves are electrically controlled, the second valve being normally closed when energized and opened when de-energized to insure lowering the separator to minimum load position in the event of a power failure.

References Cited in the file of this patent

UNITED STATES PATENTS

| | | |
|---|---|---|
| 374,404 | Field | Dec. 6, 1887 |
| 832,720 | Cravens | Oct. 9, 1906 |
| 1,086,109 | Wilkinson | Feb. 3, 1914 |
| 1,157,134 | Welge | Oct. 19, 1915 |